United States Patent
Horng et al.

(10) Patent No.: US 6,593,715 B1
(45) Date of Patent: Jul. 15, 2003

(54) SINGLE-PHASE MOTOR WITH A CONVERSION CIRCUIT

(75) Inventors: Alex Horng, Kaohsiung (TW); Ming-Sheng Wang, Kaohsiung Hsien (TW); Ying-Ya Lu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/044,970

(22) Filed: Jan. 15, 2002

(51) Int. Cl.$^7$ ................................................ H02K 29/08
(52) U.S. Cl. .................... 318/254; 318/138; 318/439
(58) Field of Search ................................ 318/254, 138, 318/439

(56) References Cited

U.S. PATENT DOCUMENTS

| | | | |
|---|---|---|---|
| 4,701,683 A | * 10/1987 | Kikkawa | 318/254 |
| 4,859,916 A | * 8/1989 | McCambridge | 318/293 |
| 5,168,202 A | * 12/1992 | Bradshaw et al. | 318/608 |
| 5,289,089 A | * 2/1994 | Aoki | 318/254 |
| 5,484,504 A | * 1/1996 | Tedders et al. | 156/433 |
| 5,847,524 A | * 12/1998 | Erdman et al. | 318/439 |

\* cited by examiner

*Primary Examiner*—Rita Leykin
(74) *Attorney, Agent, or Firm*—Bacon & Thomas, PLLC

(57) ABSTRACT

A single-phase motor comprises a [US79KUA] two-phase motor driver IC, a conversion circuit, and a coil for a motor. The driver IC includes two outputs that are serially connected to the conversion circuit and then connected to the coil. The conversion circuit includes two transistors respectively connected two ends of the coil. The outputs of the driver IC respectively send out alternate on/off signals to respectively turn the transistors on and off, thereby controlling directions of current passing the coil. Thus, the coil generates alternative magnetic fields as a result of alternative directions of the current to thereby drive the rotor.

2 Claims, 3 Drawing Sheets

SINGLE-PHASE MOTOR WITH A CONVERSION CIRCUIT

BACKGROUND OF THE INVENTION

1. Field of the Invention

The present invention relates to a single-phase motor with a conversion circuit. In particular, the present invention relates to the use of a driver integrated circuit (model no. [US79KUA]), which is generally used with a two-phase motor, with a single-phase motor by means of connecting the driver integrated circuit with an external conversion circuit before connection to the single-phase motor. The output of the driver integrated circuit drives the single-phase motor under the control of the conversion circuit.

2. Description of the Related Art

A typical driver integrated circuit of model no. [US79KUA] includes three functional modules and three terminals. As illustrated in FIG. 1, the [US79KUA] single-phase motor driver integrated circuit (IC) includes a DC voltage-regulating circuit module, a control and protection circuit module, and a Hall latch module. The DC voltage-regulating circuit module supplies stabilized DC voltage to the control and protection circuit module and the Hall latch module, respectively, thereby providing a stable operational condition for the driver IC. The control and protection circuit module includes an auto-restart circuit, a locked rotor shutdown circuit, a reverse voltage protection circuit, and a Zener diodes protect outputs circuit. The Hall latch module includes a Hall element, a Hall voltage amplifier, and a motor driver. The Hall element detects a change in the magnetic field during rotation of the rotor, and the detected weak voltage is amplified by the Hall voltage amplifier and then outputted to drive the motor driver connected to the outputs (OUT1 and OUT2). Thus, a change in the current providing an alternate on/off function is generated in the Hall latch module. The stator of the motor is thus inducted to thereby turn the rotor, and the rotor turns continuously.

FIG. 2 depicts an application circuitry of the conventional [US79KUA] driver integrated circuit and a two-phase motor. FIG. 3 is a diagram illustrating output waves of the conventional [US79KUA] driver integrated circuit, wherein the abscissa denotes time and the ordinate denotes voltage. Referring to FIG. 2, a DC voltage (3–18V) of a power-supply is inputted via Vcc to power the driver IC. In this case, the Hall element of the driver IC detects a specific period of a change in a magnetic field generated by the permanent magnet of the rotor. When the terminal OUT 1 is close, the current passes the Coil 1 to drive the rotor through a certain angle. Due to the change in the angular position of the rotor, the Hall element detects another period of the change in the magnetic field generated by the permanent magnet. At this time, the terminal OUT 1 is open and the terminal OUT2 is close such that the current passes the Coil 2 to drive the rotor through another certain angle. Referring to FIG. 3, the terminals OUT1 and OUT2 are alternately opened and closed in a synchronous manner to output square waves of identical frequency and inverted phases. Thus, the rotor is continuously driven by inducted repulsive forces generated by the Coil 1 and Coil 2 in alternative phases. However, such a driver IC can only be used with a two-phase motor having two coils; namely, it cannot be used with a single-phase motor having a single coil.

SUMMARY OF THE INVENTION

The primary object of the present invention is to provide a single-phase motor having a conversion circuit, wherein a [US79KUA] two-phase motor driver IC is connected to a single-phase motor via an external conversion circuit. The conversion circuit receives the output signals of the [US79KUA] driver IC to control alternate on/off of two transistors serially connected to two ends of a coil for a motor. The [US79KUA] two-phase motor driver IC can be selected to apply in a single-phase motor.

The secondary object of the present invention is to provide a single-phase motor having a conversion circuit, wherein the [US79KUA] two-phase motor driver IC can be used with a single-phase motor having a single coil and a simple structure. The coil structure is thus simplified, and the motor quality is improved.

A further object of the present invention is to provide a single-phase motor having a conversion circuit, wherein the [US79KUA] two-phase motor driver IC is connected to a single-phase motor via an external conversion circuit. The conversion circuit further comprises two sets of voltage-dividing circuits for reducing the power voltage to a proper extent. Thus, the available voltage of the motor is not limited by voltage feature of the [US79KUA] two-phase driver IC. As a result, the motor may work in a wider input voltage range.

The single-phase motor having a conversion circuit in accordance with the present invention comprises a [US79KUA] two-phase motor driver IC, a conversion circuit, and a coil for a motor. The driver IC includes two outputs that are serially connected to the conversion circuit and then connected to the coil. The conversion circuit includes two transistors respectively connected two ends of the coil. The outputs of the driver IC respectively send out alternate on/off signals to respectively turn the transistors on and off, thereby controlling directions of current passing the coil. Thus, the coil generates alternative magnetic fields as a result of alternative directions of the current to thereby drive the rotor. In addition, the conversion circuit comprises two sets of voltage-dividing circuits for reducing the power voltage to a proper extent such that the motor may work in a wider input voltage range. Thus, the available voltage of the motor is widened and not limited by voltage feature of the driver IC.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 4:
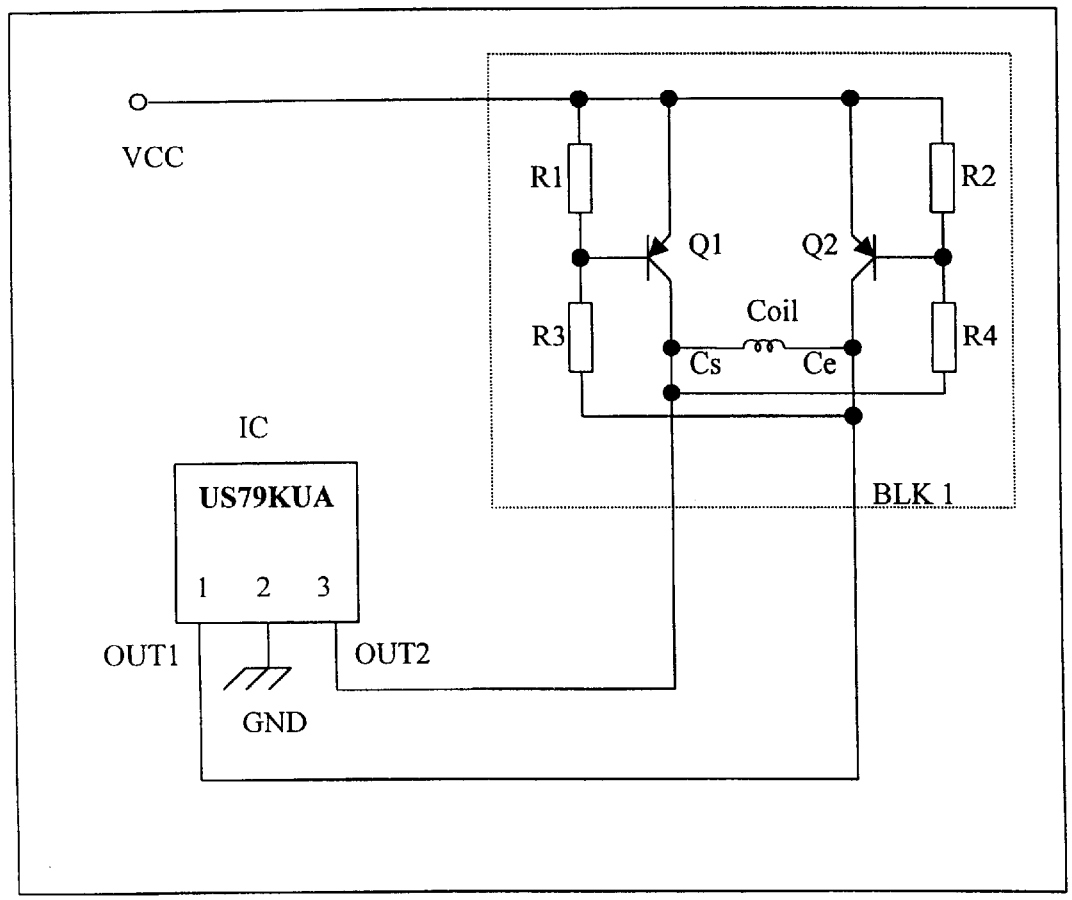
FIG. 4 is a circuitry of a first embodiment of a single-phase motor in accordance with the present invention.

FIG. 4 is a circuitry of a first embodiment of a single-phase motor in accordance with the present invention. As illustrated in FIG. 4, the first embodiment of the single-phase motor in accordance with the present invention generally includes a driver IC (model no. [US79KUA]), a conversion circuit BLK1, and a coil (Coil in FIG. 4). The driver IC is externally serially connected to the conversion circuit BLK1 and then connected to the coil. The driver IC includes two outputs OUT1 and OUT2 for outputting signals to the conversion circuit BLK1 and the coil. The conversion circuit BLK1 includes plural resistors R1, R2, R3 and R4 and two transistors Q1 and Q2. The transistors Q1 and Q2 are respectively connected to a first end Cs and a second end Ce of the coil. The resistors R1 and R3 are connected to the base of the transistor Q1, and the resistors R2 and R4 are connected-to the base of the transistor Q2. The transistors Q1 and Q2 receive the singles from the outputs OUT1 and OUT2 of the driver IC through the conversion circuit BLK1 to be alternately turned on and off, thereby controlling directions of the current passing the coil. Thus, the coil generates alternative magnetic fields resulting from the alternative directions of the current to thereby drive the rotor. Accordingly, the conversion circuit BLK1 allows the driver IC to be used with a single-phase motor having a single coil.

Still referring to FIG. 4, in the operation of the motor of this embodiment, the DC voltage (3–18V) of the power source is inputted via Vcc to supply power to the driver IC. The Hall element of the driver IC detects a specific period of a change in the magnetic field generated by the permanent magnet on the rotor. When the output OUT1 is close, the current passes the resistors R1 and R3 to create a bias on the base of the transistor Q1. A portion of the current pass the transistor Q1 and the resistor R3 to thereby turn the transistor Q1 on. At this time, the first end Cs of the coil is at a high voltage, and the transistor Q2 is off such that the second end Ce of the coil is at a low voltage (GND). The voltage difference between the first end Cs and the second end Ce of the coil causes the current to run from the first end Cs to the second end Ce, and the rotor is driven through a certain angle by means of the current passing the coil.

Due to the change in the angular position of the rotor, the Hall element detects another period of the change in the magnetic field generated by the permanent magnet. At this time, the output OUT1 is open (off) and the output OUT2 is close. The current passes the resistors R2 and R4 to bias the base of the transistor Q2. A portion of the current passes the transistor Q2 and the resistor R4 to thereby turn the transistor Q2 on. At this time, the second end Ce of the coil is at a high voltage, and the transistor Q1 is off such that the first end Cs of the coil is at a low voltage (GND). The potential difference between the first end Cs and the second end Ce of the coil causes the current to run from the second end Ce to the first end Cs, and the rotor is driven through another certain angle by means of the current passing the coil. Thus, by means of alternately turning the outputs OUT1 and OUT2 of the driver IC on and off and under the control of the conversion circuit BLK1, the transistors Q1 and Q2 are alternately turned on and off to synchronously change high/low voltages of inverted phases at the ends Cs and Ce of the coil in an alternate manner, thereby causing the stator to create alternating magnetic fields to drive the rotor.

Figure 5:
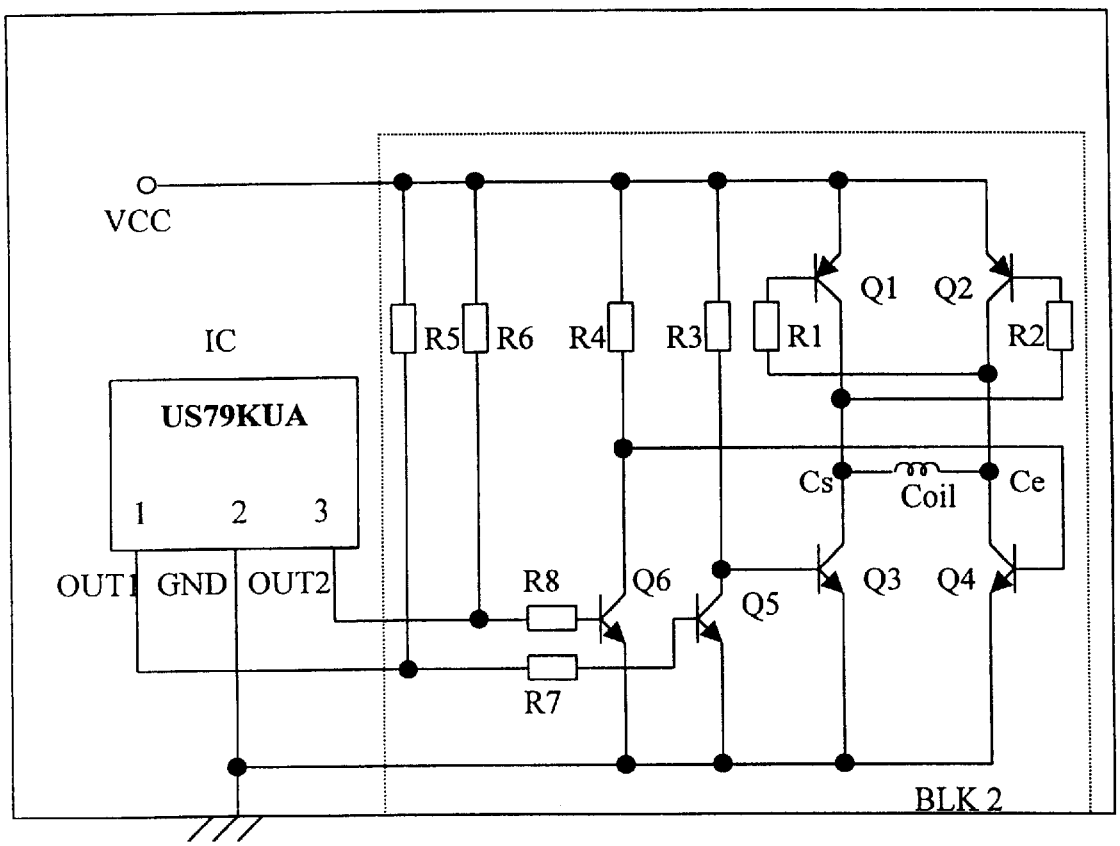
FIG. 5 is a circuitry of a second embodiment of the single-phase motor in accordance with the present invention.

FIG. 5 is a circuitry of a second embodiment of the single-phase motor in accordance with the present invention. The elements in FIG. 5 identical to those in FIG. 4 are denoted by identical numerals.

As illustrated in FIG. 5, the second embodiment of the single-phase motor in accordance with the present invention generally includes a driver IC (model no. [US79KUA]), a conversion circuit BLK2, and a coil (Coil in FIG. 5). The conversion circuit BLK2 includes plural resistors R1, R2, R3, R4, R5, R6, R7, and R8 and six transistors Q1, Q2, Q3, Q4, Q5, and Q6.

The transistors Q1, Q2, Q3, Q4, Q5, and Q6 are respectively connected to a first end Cs and a second end Ce of the coil. The transistors Q5 and Q6 are alternately turned on and off by two outputs OUT1 and OUT2 of the driver IC to thereby control the directions of the current passing the coil under the is control of the conversion circuit BLK2. The transistors Q1, Q2, Q3, and Q4 together form a fully symmetric complimentary type driver circuit, wherein the transistors Q1 and Q4 and the transistors Q2 and Q3 are alternately turned on and off to cause the current to alternately run from the first end Cs to the second end Ce of the coil and from the second end Ce to the first end Cs of the coil.

The resistor R3 and the transistor Q5 form a switch control circuit that is electrically connected to the output OUT1 of the driver IC. The resistor R4 and the transistor Q6 form another switch control unit that is electrically connected to the output OUT2 of the driver IC. By means of using a voltage change between the collector of the transistors Q5 and Q6, the control signals from the outputs OUT1 and OUT2 of the driver IC control the alternate on/off operation of the transistors Q3 and Q4 of the fully symmetric complimentary driver circuit. In addition, the transistors R5 and R7 and the transistors R6 and R8 respectively form two sets of voltage dividing circuits that, in addition to controlling the transistors Q5 and Q6, reduces the DC input voltage to a value below 18V to assure that the voltage inputted to the driver IC shall not exceed the rated available voltage of the driver IC.

Still referring to FIG. 5, in the operation of the motor of this embodiment, the DC voltage (3–24V) of the power source is inputted via Vcc to supply power to the driver IC. The Hall element of the driver IC detects a specific period of a change in the magnetic field generated by the permanent magnet on the rotor. When the output OUT1 is off, the current passes the resistors R5 and R7 and the transistor Q5 to turn the transistor Q5 on. Since the transistor Q5 is on to allow the current from the Vcc to pass the resistor R3 and the transistor Q3 and then be connected to the ground GND, the base of the transistor Q3 is not biased and is thus open. In this case, when the other output OUT2 is on, the current passing the resistors R6 and R8 and the transistor Q6 is connected to ground GND through the driver IC such that the base of the transistor Q6 is not biased and is thus open. The resistors R6 and R8 cause a voltage drop in the output OUT2 of the driver IC. Since the transistor Q6 is off, the current passing the resistor R4 is connected to the transistor Q4 that is turned on accordingly. At this time, the second end Ce of the coil is at a low voltage (GND), and the bias current of the transistor Q2 runs from Vcc through the transistor Q1, resistor R1, and transistor Q4, thereby turning the transistor Q1 on. Meanwhile, the first end Cs of the coil is at a high voltage. The transistor Q2 and the resistor R2 are open, as there is no potential difference between two ends of the transistor Q2 and the resistor R2. In this case, the current runs from Vcc to ground (GND) via the transistor Q1, the first end Cs of the coil, the second end Ce of the coil, and the transistor Q4. A magnetic field is generated by the current passing the coil to drive the rotor to turn through a certain angle.

Still referring to FIG. 5, after the rotor has turned through the certain angle as mentioned above, the Hall element detects the next period of the magnetic field generated by the permanent magnet. When the output OUT1 of the driver IC is off, the current passes the resistors R6 and R8 and the transistor Q6 to turn the transistor Q6 on. Since the transistor Q6 is on to allow the current from Vcc to pass the resistor R4 and the transistor Q4 and then be connected to ground GND, the base of the transistor Q4 is not biased and is thus on. In this case, when the other output OUT1 of the driver IC is on, the current passing the resistors R5 and R7 and the transistor Q5 is connected to ground GND through the driver IC such that the base of the transistor Q5 is not biased and is thus open. The resistors R5 and R7 also cause a step-down at the output OUT1 of the driver IC. Since the transistor Q5 is off, the current passing the resistor R3 is thoroughly connected to the transistor Q3 that is turned on accordingly. At this time, the first end Cs of the coil is at a low voltage (GND), and the bias current of the transistor Q2 runs from Vcc through the transistor Q2, resistor R2, and transistor Q3, thereby turning the transistor Q2 on. Meanwhile, the second end Ce of the coil is at a high voltage. The transistor Q2 and the resistor R2 are open, as there is no potential difference between two ends of the transistor Q2 and the resistor R2. In this case, the current runs from the Vcc to the ground GND via the transistor Q2, the second end Ce of the coil, the first end Cs of the coil, and the transistor Q3. A magnetic field is generated by the current passing through the coil to drive the rotor to turn through another certain angle. Thus, by means of alternate on/off operation of the outputs OUT1 and OUT2 of the driver IC to alternately turn the transistors Q1 and Q2 on and off, synchronous change in high/low voltages of inverted phases is generated in two ends Cs and Ce of the coil. As a result, the stator generates alternating magnetic fields to drive the rotor.

Figure 1:
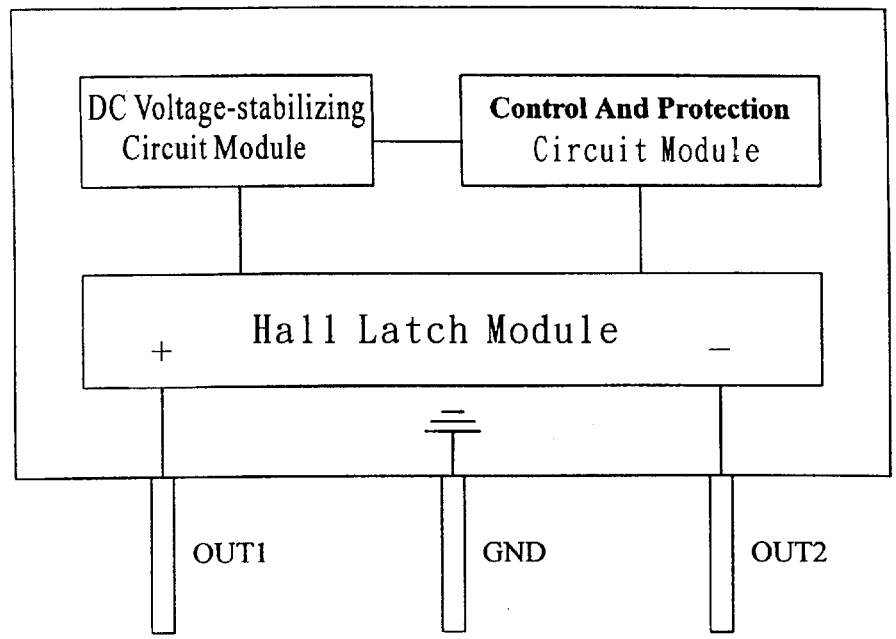
FIG. 1 is a schematic block diagram of a conventional [US79KUA] driver integrated circuit.
Figure 2:
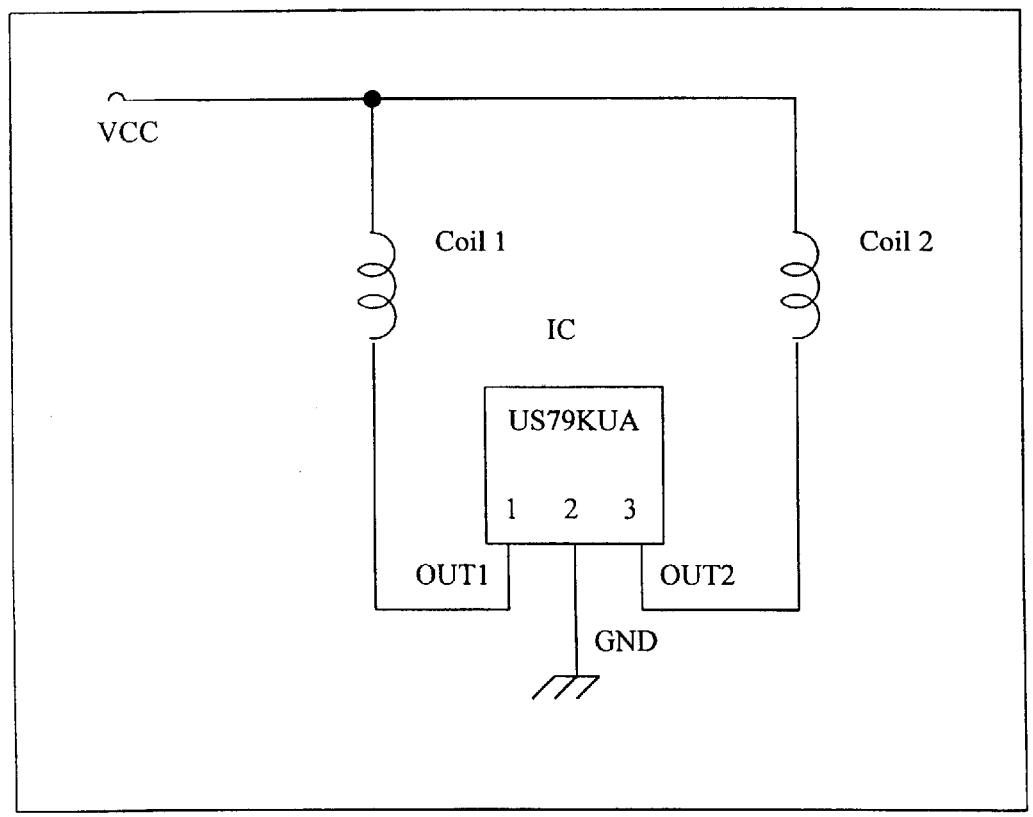
FIG. 2 is an application circuitry of the conventional [US79KUA] driver integrated circuit and a two-phase motor.
Figure 3:
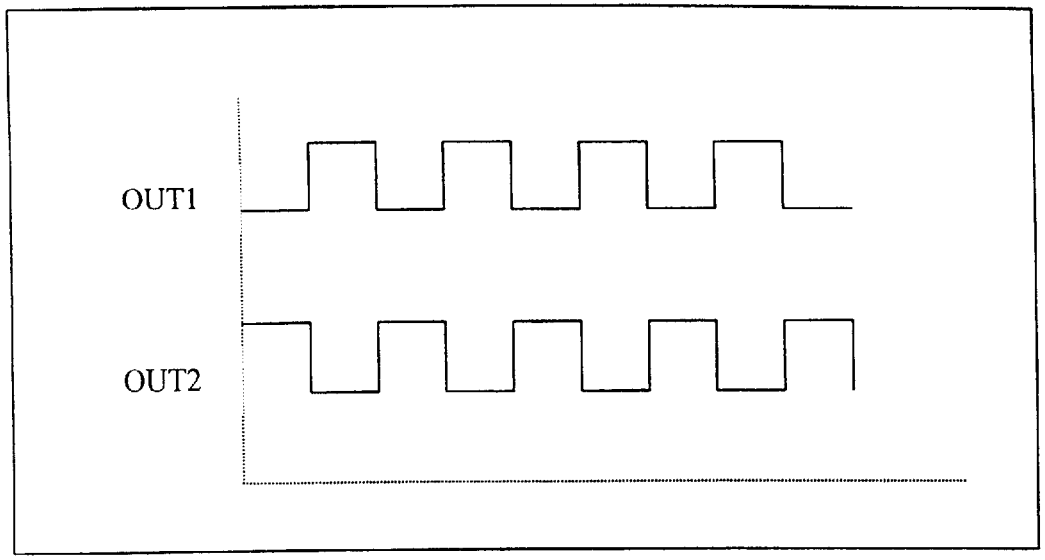
FIG. 3 is a diagram illustrating output waves of the conventional [US79KUA] driver integrated circuit.

Comparing FIG. 2 with FIG. 4, the conventional two-phase motor is directly connected to an application circuitry for the [US79KUA] driver IC, but the single-phase motor in accordance with the present invention uses a conversion circuit BLK1 to allow the use of the [US79KUA] two-phase motor driver IC with the single-phase motor. The coil structure is thus simplified, and the motor quality is improved.

Comparing FIG. 2 with FIG. 5, the conventional two-phase motor is it directly connected to an application circuitry for the [US79KUA] driver IC powered by a DC voltage in a range of 3–18V. The single-phase motor in accordance with the present invention uses a conversion circuit BLK2 comprising resistors R5 and R7 as well as resistors R6 and R8 that respectively form two sets of voltage dividing circuits to thereby reduce the input voltage higher than 24V to be below 18V. As a result, damage to the driver IC is avoided, as the available voltage of the driver IC would not exceed the rated voltage. Thus, the motor in accordance with the present invention may work in a wider input voltage range.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A single-phase motor with a conversion circuit, comprising a two-phase motor drivel IC comprising a first output, a second output, and a ground, wherein the driver IC is a US79KUA IC comprising a DC voltage-regulating circuit module, a control and protection circuit module, and a Hall latch module;

a coil including a first end and a second end; and a conversion circuit connected to the first output and the second output of the driver IC, the conversion circuit including a first transistor and a third transistor connected to the first end of the coil, and a second transistor and a fourth transistor connected to the second end of the coil, the first, second, third, and fourth transistors forming a complementary type driver circuit, the first output and the second output of the drivel IC being alternately turned on and off to control a direction of current from the first end to the second end of the coil and vice versa, the coil thereby generating alternative magnetic fields for driving a rotor, wherein the conversion circuit further comprises a fifth transistor and a sixth transistor, the fifth transistor and the sixth transistor together forming an on/off control circuit and being respectively connected to the first output and the second output of the driver IC, the fifth transistor and the sixth transistor respectively controlling on/off of the third transistor and the fourth transistor, wherein the Hall latch module of the driver IC detects a specific period of the change in the magnetic field generated by the permanent magnet of the rotor, wherein when the first output of the driver IC turns the fifth transistor on while the second output turns the sixth transistor off, the current passes the first transistor, the second end of the coil, the first end of the coil, and the fourth transistor, and wherein when the first Output of the driver IC turns the fifth transistor off while the second output turns the sixth transistor on, the current passes the second transistor, the first end of the coil, the second end of the coil, and the third transistor, and further comprising two sets of voltage dividing circuits for respectively controlling the fifth transistor and the sixth transistor and for dividing voltages, each of the sets of voltage dividing circuits including plural resistors.

2. The single-phase motor with a conversion circuit as claimed in claim 1, wherein the first output and the second output of the driver IC are respectively connected to the second end and the first end of the coil, the Hall latch module detecting a specific period of a change in a magnetic field generated by a permanent magnet of the rotor, wherein when the first output of the driver IC is close, the current passing the first transistor to make the second end of the coil at a high voltage while the second transistor is turned off to make the first end of the coil at a low voltage such that the current runs from the second end to the first end of the coil; the Hall latch module detecting another specific period of a change in a magnetic field generated by the permanent magnet of the rotor, wherein when the second output of the driver IC is close, the current passing the second transistor to make the first end of the coil at a high voltage while the first transistor is turned off to make the second end of the coil at a low voltage such that the current runs from the first end to the second end of the coil.

* * * * *